United States Patent [19]

Hjorth-Hansen

[11] Patent Number: 4,678,163
[45] Date of Patent: Jul. 7, 1987

[54] TIRE HANDLING APPARATUS

[76] Inventor: Arne Hjorth-Hansen, Virringvej 2, DK-8660 Skanderborg, Denmark

[21] Appl. No.: 908,781

[22] Filed: Sep. 18, 1986

Related U.S. Application Data

[63] Continuation of Ser. No. 707,031, Mar. 1, 1985, abandoned.

[51] Int. Cl.⁴ .............................................. B60C 25/14
[52] U.S. Cl. .................................. 254/50.2; 254/50.3
[58] Field of Search .............................. 254/50.1–50.4, 254/88; 157/1

[56] References Cited

U.S. PATENT DOCUMENTS

| | | | |
|---|---|---|---|
| 2,375,595 | 5/1945 | Stoehr | 254/50.3 |
| 2,968,469 | 1/1961 | Eriksen | 254/50.3 |
| 3,052,447 | 9/1962 | Mishler | 254/50.2 |
| 3,540,697 | 11/1970 | Matteuzzi | 254/50.2 |
| 3,830,469 | 8/1974 | Oaks | 254/50.3 |
| 3,847,376 | 11/1974 | Binding | 254/88 |

Primary Examiner—Robert C. Watson
Attorney, Agent, or Firm—Antonelli, Terry & Wands

[57] ABSTRACT

A tire handling apparatus which includes a support member for receiving and supporting the tire in an upright position. The support member includes tire spreading claws adapted to be brought into engagement with an inside of opposed tire bead areas and draw the opposed bead areas away from each other to facilitate access to an interior of the tire, when the tire is located in a convenient working height upon elevation of the tire from a floor supporting the apparatus. The support member has a height dimension substantially smaller than the convenient working height and is also associated with an underlying floor supported lower apparatus part through a light system adapted to raise and lower the support member between a lower tire receiving position and an elevated working position.

10 Claims, 5 Drawing Figures

TIRE HANDLING APPARATUS

This is a continuation of application Ser. No. 707,031, filed Mar. 1, 1985 now abandoned.

This invention relates to a tire handling apparatus as usable in workshops for holding a tire in a conveniently elevated working position for enabling repairs, inspection or other relevant operations on the tire. Such an apparatus is often referred to as a tire spreader, because it is normally provided with opposed claw tools operable to grip respective opposed tire bead areas and pull them from each other, whereby the inside of the tire or the engaged portion thereof becomes more easily visible and accessible.

It is a natural desire that the tire should be held in an elevated and generally vertical position, such that the lower part of the tire is located in a convenient working level, and at least for the handling of truck tires and other heavy tires it is customary that the spreader apparatus is provided with an e.g. pneumatically operated lift element, which is designed so as to be able to easily receive a tire as rolled from the floor onto the lift element and then to lift the tire into a position, in which the tire is engageable by the said spreader hook tools.

With the prior art spreaders the problem is observed that the tire, when rolled onto the lift element, should be manually held in its vertical position during the lifting movement of the lift element, and when the tire has been lifted as required at least one of the said opposed claw members should be brought into engagement with the tire also in a manually controlled manner, while the tire is still held manually, i.e. the operator often wishes to have "three hands" for safely operating the apparatus during the mounting and demounting phases of the tire.

It is the purpose of this invention to provide a spreader apparatus, which enables the operator to mount and demount a tire in an easy manner.

According to the invention the claw tools are mounted in a vertically displaceable manner between a low position, in which they are engageable with the beads of a tire as rolled from the floor horizontally into a position between the claw tools or as rolled up onto a carrier element as associated with and located below the claw tools, and an elevated position as corresponding to the said desired working height. It is sufficient to hereby roll the tire directly into a position, in which it is seizable by the lowered claw tools, and then actuate the claw tools to firmly engage the tire, whereafter the tire as now held and stabilized by the claw tools is liftable to the desired working height without the operator having to hold or guide the tire in any way. The operator, therefore, will need no "third hand" for bringing the tire up to the desired working level.

In practice it is preferred that the tire in its claw tool engaged condition is supported on a carrier member and that such a carrier member even includes the required means for holding and controlling the movements of the claw tools. The carrier member, therefore, will have to show a certain building height, just as some building height will be required for an underlying base unit operable to cause the carrier member to be lifted. The combined carrier member and base unit, therefore, should be supported below ground level for enabling a tire to be rolled purely horizontally into its claw tool engageable position on the carrier member. Such a mounting of the entire unit is perfectly possible, but experiments have shown that the said combined building height may be small enough to be acceptable even when the base unit is supported on a workshop floor, because in practice it is very easy to roll a tire up onto a slightly raised carrier member, in a lowered position thereof. The apparatus, therefore, will not require to be mounted in any special floor lowering, i.e. it may be an easily movable, generally ground supported apparatus.

The use of the carrier member may even include the advantage that the tire can be supported on support roller means as associated with the carrier member such that the tire will be easily rotatable on the carrier member when the claw tools are designed or are releasable so as to allow for such a rotation of the tire, whereby all interior surface portions of the tire will be easily inspectable in a successive manner.

In the following the invention is described in more detail with reference to the accompanying drawing, in which.

Figure 2:
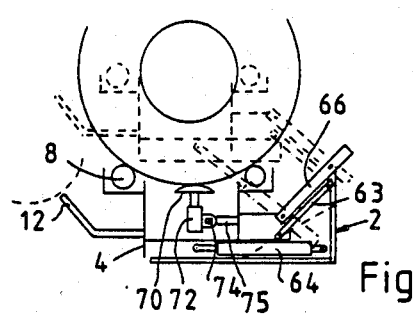
FIG. 2 is a schematic side view thereof.
Figure 3:
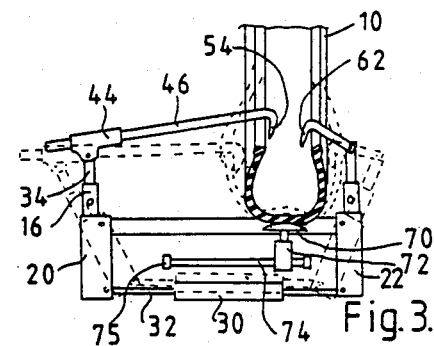
FIG. 3 is a schematic front view, illustrating the tire spreading operation of the apparatus.
Figure 4:
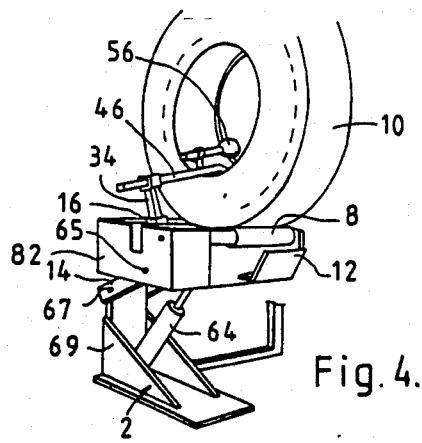
FIG. 4 is a perspective view of the apparatus with its tire assuming an elevated position.

The apparatus as shown in FIGS. 1-4 comprises a floor supported lower part 2 and an upper part 4, which, as shown in FIG. 4, is liftable from the lower part 2 by an intermediate lift and guiding structure generally designated 6. The upper part 4 carries a pair of horizontal rollers 8, which may support a tire 10 (FIG. 2) as rolled onto the top side of the upper part 4. In order to facilitate a tire 10 to be rolled into this position from the floor the front side of the lower part 2 is provided with a forwardly protruding, upstanding edge member 12, which will cause a tire 10 as rolled against the apparatus to be dynamically lifted into its position resting on the rollers 8. Any tendency of the tire to be rolled beyond the pair of rollers 8 may be counteracted by a rear, inclined stop plate 14 as constituting a part of the said lift structure (see below).

The upper part 4 has at either side an upstanding tool socket 16 and 18, respectively, mounted on a support member 20 and 22, respectively, which is pivotally secured to the upper part 4 about an upper, side parallel horizontal axis, the support member to this end being pivoted at 24 and 26, respectively, to a front panel 28 of the upper part 4 as well as pivoted in a similar, non-illustrated manner to rear panel portions of the upper part 4. The lower ends of the support members 20 and 22 are interconnected through a transverse, length adjustable element such as a pneumatic cylinder 30 with an associated piston rod 32 (FIG. 3), such that the lower ends of the support members may hereby be caused to pivot towards each other, e.g. to positions as shown in dotted lines in FIG. 3, whereby the tool sockets 16 and 18 are pivoted correspondingly outwardly.

Each of the tool sockets 16 and 18 holds a height adjustable telescopic carrier rod 34 and 36, respectively, which can be arrested in any desired height position, e.g. by a clamp screw 38 and 40, respectively.

The top end of the carrier rod 34 at the left hand side of the apparatus is a mounting base for a pivot bracket 42 of an additional tool socket 44, which holds a telescopic tool rod 46 such that this rod can be fastened, by means of a clamp screw 48, in any length position relative the socket 44 or in any one of a number of length positions as given by the screw 48 cooperating with any selected hole 50 of a row of such holes provided in the tool rod 46. At its upper, outer end the tool rod 46 is provided with a claw member 52 having outer, inwardly and downwardly directed claw legs 54. Moreover, the top end of the tool rod 46 preferably carries an outer electric lamp 56 operable to inwardly illuminate the area of the claw legs 54. It will be understood that the entire unit including the socket 44, the tool rod 46, the claw member 52 and the lamp 56 may be pivoted inwardly about the top end of the carrier rod 34 by the brackets 42, as illustrated in FIG. 3.

Figure 1:
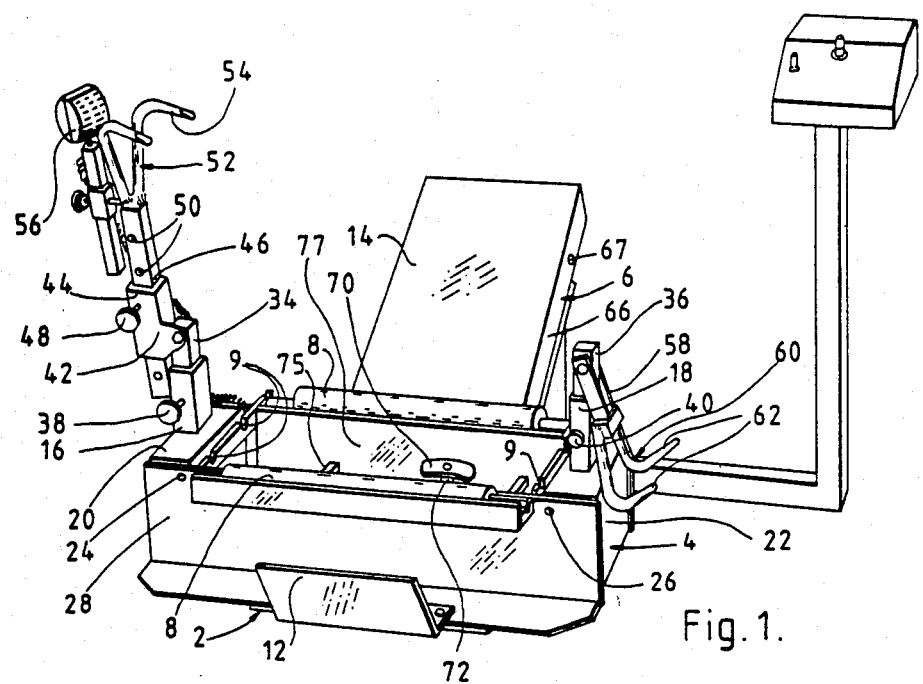
FIG. 1 is a perspective view of an apparatus according to the invention

At the right hand side of the apparatus the top portion of the telescopic carrier rod 36 is pivotally connected with a claw tool comprising a base member 58 and, outermost thereon, a claw tool 60 with outer claw legs 62. This claw tool assumes a rest position as shown in FIG. 1, but like the opposite claw tool it is easily pivoted inwardly, as shown in FIG. 3.

Between the lower and upper parts 2 and 4 is arranged the said lift system 6, which, as shown in FIG. 4 is operable to raise the upper part 4 into an elevated working height. The lift system comprises a pneumatic cylinder 64 and a pivot element 66, which, at 67 is hinge connected with an upper rear portion 69 of the lower part 2, at 65, with a middle portion of the upper part 4 so as to guide the upper part in a substantially horizontal position thereof during raising and lowering in response to operation of the cylinder 64. In its lowered position the element 66 constitutes the inclined stop plate 14.

When a tire 10 has been rolled up onto the upper part 4 (FIG. 2) the operator, holding the tire upright with one hand, causes first one and then the other claw tool 52,60 to be pivoted inwardly, whereby the claw legs as shown in FIG. 3 will be swung down into the space between the opposed beads of the lower portion of the tire. Thereafter the cylinder 30 is operated, e.g. by actuation of a pedal switch, to pivot the support members 20 and 22 to the positions shown in dotted lines, whereby the tool rods 46 and 58 and therewith the claw tools 52 and 60 will be pulled away from each other, such that the opposed tire beads are drawn from each other and the tire is hereby stabilized in its vertical position.

As shown in FIG. 3 the tire 10 is rolled onto the upper part 4 close to the right hand side thereof, whereby the claw tool 60 in the short tool rod 58 as properly or at least roughly height adjusted by means of the telescopic rod 36 will be able to cooperate with a tire of any size, while the length of the telescopic rod 46 of the opposite tool arrangement should be adjusted according to the width of the particular tire. The apparatus may be wide enough to be able to handle practically all sizes of commercial tires.

Once the tire has been gripped by the claw tools the operator need no longer hold the tire, and he can actuate the lift cylinder 64 for raising the upper part 4 with the tire 10 to a suitable working height. If a repair area on the tire has been spotted beforehand the operator will take care to place the tire with the repair area just above the upper part 4, between the claw tools 52 and 60, by rotating the tire on the rollers 8 already before the claw tools are or were actuated at the beginning. Thus, with the repair area now located at a convenient working height and between the expanded claw tools and lightened by the lamp 56, the operator will have easy and convenient access to the repair area.

If a repair area has not been spotted beforehand the operator, in the raised position of the tire, may inspect the tire closely, and if a repair area is found it will be easy for the operator to release the claw tools by inversed operation of the spreader cylinder 30 and then manually rotate the tire 10 on the rollers 18 until the repair area is located just above the upper part 4, whereafter the spreader cylinder 30 is reactuated to cause the tire to be firmly gripped in the relevant repair position.

It is shown in FIGS. 1 and 2 that the upper part 4 may be provided with a small size lift pad 70, mounted e.g. on the piston rod of a vertical pneumatic cylinder 72 as held in the upper part 4 between the rollers 18 and in a transversely position adjustable manner e.g. slidably along a transverse guiding rail 74 (FIG. 2). The lift pad, therefore, can be adjusted to assume a position just underneath a repair area of the overlying tire, and when the cylinder 72 is actuated to push the pad 70 upwardly the repair area will be pushed correspondingly locally upwardly, whereby grinding and other work on the repair area will be facilitated. It will be appreciated that the pad 70 could be raisable by lift means other than a working cylinder 72, even by the lift cylinder 64 upon the upper part having reached its uppermost position, and that the narrow pad 70 may be substituted by a liftable structure extending practically all over the width of the upper part 4. In the latter case the repair area will not be liftable pointwise, but already a general lifting of the entire cross sectional area of the tire adjacent the repair area will make the repair area more easily workable.

Figure 5:
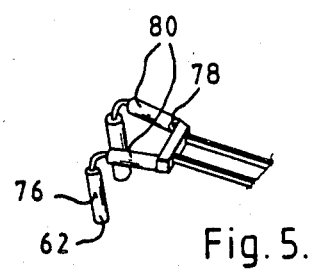
FIG. 5 is a perspective view of the tire gripping claws of a modified apparatus.

As mentioned, the operator may manually rotate the tire in its elevated position upon releasing the claw tools 52 and 60 from their engagement with the tire beads, but it is an alternative possibility to let the rollers 8 be drivable by a motor generally designated by the reference character M and to provide the claw tools with outer rotary bushing elements enabling the claw tools to keep the tire beads expanded without essentially resisting a rotation of the tire. Such a claw tool is shown in FIG. 5. The outer claw fingers 62 are surrounded by easily rotatable bushing members 76, and even the top portions of the claw tool, designated 78, are surrounded by easily rotatable bushing members 80. Such a claw tool, therefore, may still effect the desired spreading of the beads of the tire, though without resisting a rotation of the tire as caused e.g. by a motor driven rotation of the support rollers 18.

It should be mentioned that the embodiment shown in FIG. 4, although fully illustrative for the lifting and spreading functions of the device of FIG. 1, incorporates the modification of the upper part 4 being provided with a side box 82, in which a motor for driving one or both of the rollers 8 is housed. The lift control means comprises, in addition to the cylinder 64 and the pivot element 66, another pivot member 63 (FIG. 2), which is parallel with the element 66 and thus serves to keep the upper part 4 in a horizontal position during the lifting and lowering thereof.

The carrier rail 74 of the cylinder 72 of the lift pad 70 is secured to brackets 75 rigidly mounted on a rear wall 77 of the upper part 4, see also FIG. 1.

The roller 8 are shown mounted for cooperation with tires of large sizes (although the tire shown in FIG. 3 is representative of a small size), but as shown in FIG. 1 socket notches 9 are provided in side members of the upper part 4 for enabling the rollers to be shifted into positions of reduced mutual distance so as to accomodate small size tires.

It will be understood that the invention is not limited to the devices as illustrated on the drawing, as the devices may be largely modified within the scope of the invention as defined by the following claims.

What is claimed is:

1. A tire handling apparatus of a tire spreader type, the apparatus comprising a support member for receiving and supporting a tire in an upright position thereof, said support member including tire spreading claw means operable to be brought into engagement with an inside of opposed tire bead areas and to draw such opposed bead areas away from each other for facilitating access to an interior of the tire with the latter located in a convenient working height upon elevation of the tire from a floor supporting the apparatus; wherein the support member is a unit of a height dimension substantially smaller than said convenient working height; wherein the support member is associated with an underlying, floor supported lower apparatus part through a lift system operable to automatically raise and lower the support member between a lower tire receiving position and an elevated working position upon an actuation of the lift system; and wherein the spreading claw means are operated during a raising movement of the lower apparatus part by said lift system so as to support the tire in an upright position.

2. A tire handling apparatus according to claim 1, wherein there is arranged, in front of the support member in the lowered position thereof, an edge member presenting an edge portion located so as to facilitate a dynamic lifting of a tire onto the support member in response to the tire being rolled against said edge portion.

3. A tire handling apparatus according to claim 1, wherein the active, tire supporting top portion of the support member includes two parallel rollers.

4. An apparatus according to claim 3, in which there is arranged, at the rear of the apparatus, an upwardly and rearwardly inclined stop plate member serving as an overrun stop for a tire as rolled up onto the support rollers.

5. A tire handling apparatus of a tire spreader type, the apparatus comprising a support member for receiving and supporting a tire in an upright position thereof, said support member comprising tire spreading claw means operable to be brought into engagement with an inside of opposed tire bead areas and to draw said opposed bead areas away from each other for facilitating access to an interior of the tire with the latter located in a convenient working height upon elevation of the tire from a floor; the support member is a unit of a height dimension substantially smaller than said convenient working height and is associated with an underlying, floor supported lower apparatus part through a lifting system operable to raise and lower the support member between a lower tire receiving position and an elevated working position; the active. tire supporting top portion of the support member includes two parallel rollers; and upwardly and rearwardly inclined stop plate member serving as an overrun stop for a tire as rolled upon onto the support rollers is arranged at a rear of the apparatus, and the inclined stop plate member forms part of said lift system, the stop plate member being respectively pivoted, at opposite ends, to the support member and the lower apparatus part.

6. An apparatus according to claim 3, in which at least one of the said rollers are drivingly connected with a motor for enabling power driven rotation of the roller.

7. An apparatus according to claim 6, in which the spreading claw means are provided with rotary tire bead engaging bushing means.

8. An apparatus according to claim 1, in which the claw means at one side of the apparatus are designed for cooperation with a nearby tire bead of a tire as placed in the apparatus with one side located close to said one side of the apparatus, while the opposite claw means are arranged in a tire width adjustable manner.

9. An apparatus according to claim 3, in which there is arranged, between the support rollers and underneath their common tire support plane, a lift member operable to force upwardly a local tire area placed between the support rollers.

10. A tire handling apparatus of a tire spreader type, the apparatus comprising a support member for receiving and supporting a tire in an upright position thereof, said support member comprising tire spreading claw means operably to be brought into engaement with an inside of opposed tire bead areas and to draw said opposed bead areas away from each other for facilitating access to an interior of the tire with the latter located in a convenient working height upon elevation of the tire from a floor; the support member is a unit of a height dimension substantially smaller than said convenient working height and is associated with an underlying, floor supported lower apparatus part through a lifting system operable to raise and lower the support member between a lower tire receiving position and an elevated working position; the active, tire supporting top portion of the support member includes two parallel rollers; a lift member is disposed between the support rollers and beneath their common tire support plane, said lift member being operable to upwardly force a local tire area placed between the support roller, and wherein said lift member is position adjustable throughout at least a partial width of the upper support part of the apparatus.

* * * * *